United States Patent
Lavezzi et al.

(10) Patent No.: US 11,052,882 B2
(45) Date of Patent: Jul. 6, 2021

(54) LEVER ASSEMBLY

(71) Applicant: FRENI BREMBO S.P.A., Bergamo (IT)

(72) Inventors: Roberto Lavezzi, Curno (IT); Alessandro Esposito, Curno (IT); Ivan Maggioni, Curno (IT)

(73) Assignee: Freni Brembo S.p.A., Bergamo (IT)

( * ) Notice: Subject to any disclaimer, the term of this patent is extended or adjusted under 35 U.S.C. 154(b) by 64 days.

(21) Appl. No.: 16/472,578

(22) PCT Filed: Dec. 14, 2017

(86) PCT No.: PCT/IB2017/057923
§ 371 (c)(1),
(2) Date: Jun. 21, 2019

(87) PCT Pub. No.: WO2018/116087
PCT Pub. Date: Jun. 28, 2018

(65) Prior Publication Data
US 2019/0322251 A1    Oct. 24, 2019

(30) Foreign Application Priority Data

Dec. 23, 2016   (IT) ..................... 102016000130793

(51) Int. Cl.
*B60T 7/08*    (2006.01)
*B62K 23/02*   (2006.01)
(Continued)

(52) U.S. Cl.
CPC ............... *B60T 7/08* (2013.01); *B62K 23/06* (2013.01); *B62L 3/023* (2013.01)

(58) Field of Classification Search
CPC .......... B60T 7/08; B62K 23/02; B62K 23/06; B62L 3/02; B62L 3/023; G05G 1/04
See application file for complete search history.

(56) References Cited

U.S. PATENT DOCUMENTS 4,785,683 A * 11/1988 Buckley .................... B62L 3/02
                                                        74/489
4,850,241 A *  7/1989 Buckley ................. B60T 11/06
                                                        74/502.2
(Continued)

FOREIGN PATENT DOCUMENTS

CN   201961485 U *  9/2011
DE       807064 C *  6/1951 ............... B62L 3/02
(Continued)

OTHER PUBLICATIONS

Wikipedia.com page for Punch (tool); https://en.wikipedia.org/wiki/Punch_(tool); Published date of Dec. 17, 2015 (Year: 2015).*

(Continued)

*Primary Examiner* — Adam D Rogers
(74) *Attorney, Agent, or Firm* — Marshall & Melhorn, LLC (57) ABSTRACT

A lever assembly may have a control lever having at least one lever coupling portion delimiting a lever rotation seat. The assembly may also have a lever support having at least one support tooth with a tooth seat. An articulation pin may be received in the tooth seat and in the lever rotation seat. The lever assembly may have at least one cover connected to the lever support at least partially closing one of the tooth seat and rotation seat to prevent the pin from exiting said seats, thus rotatably constraining the lever to the support.

10 Claims, 6 Drawing Sheets

(51) Int. Cl.
*B62L 3/02* (2006.01)
*B62K 23/06* (2006.01)

(56) References Cited

U.S. PATENT DOCUMENTS

| | | | | |
|---|---|---|---|---|
| 7,210,371 | B2* | 5/2007 | Barnett | B62K 23/06 |
| | | | | 74/502.2 |
| 8,342,305 | B2* | 1/2013 | Moore | B60T 11/22 |
| | | | | 188/344 |
| 9,815,440 | B2* | 11/2017 | Colombo | B62L 3/023 |
| 2010/0050807 | A1* | 3/2010 | Tsai | B62K 23/06 |
| | | | | 74/502.2 |
| 2012/0160053 | A1* | 6/2012 | Hon | B62K 23/06 |
| | | | | 74/522 |
| 2012/0199432 | A1* | 8/2012 | Tsai | B60T 11/18 |
| | | | | 188/344 |
| 2014/0260756 | A1* | 9/2014 | Holland | G05G 1/04 |
| | | | | 74/491 |

FOREIGN PATENT DOCUMENTS

| | | | | |
|---|---|---|---|---|
| DE | 4418703 A1 * | 11/1995 | ......... | F16D 65/0972 |
| DE | 29918245 U1 | 2/2000 | | |
| EP | 0504118 A1 | 9/1992 | | |
| FR | 2239907 A5 | 2/1975 | | |
| WO | WO-2014040248 A1 * | 3/2014 | ............... | B25C 5/11 |
| WO | WO-2020099968 A1 * | 5/2020 | .............. | B62L 3/023 |

OTHER PUBLICATIONS

European Patent Office, Office Action in Application No. EP17826565.8 dated Jul. 9, 2020, 7 pages.

* cited by examiner

Fig. 1

(STATE OF THE ART)

Fig. 2

(STATE OF THE ART)

Fig. 3

(STATE OF THE ART)

Fig. 4

(STATE OF THE ART)

LEVER ASSEMBLY

FIELD OF THE INVENTION

The present invention relates to a lever assembly, in particular a lever assembly for vehicles controlled by means of a handle, such as, for example, motor vehicles and or snowmobiles.

BACKGROUND ART

As known, control levers, e.g. for braking systems or for clutches, which are easy to be constructed and assembled, are increasingly required.

Figure 1:
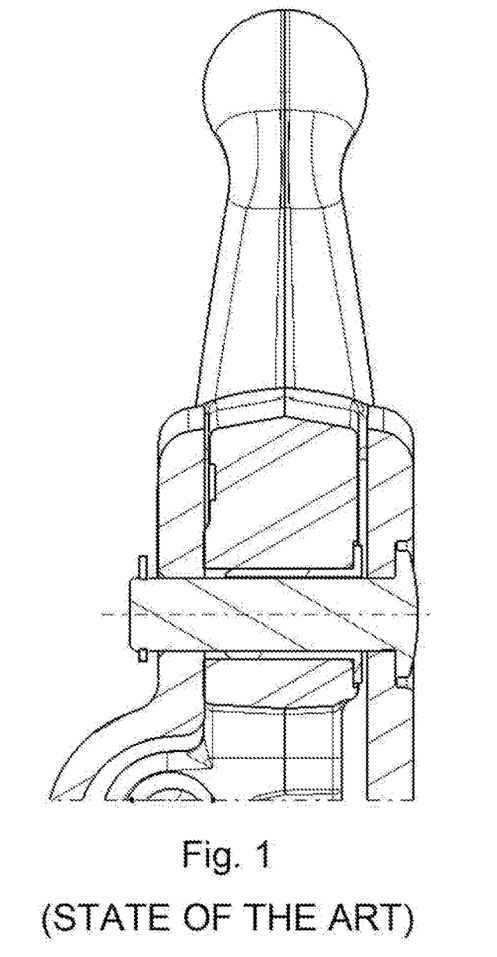
FIG. 1 is a local section view of a solution according to the prior art.

FIG. 1 shows a local section of a lever assembly according to a first prior art, where the pin, which forms the rotation hinge element of the lever with respect to its support, is received in through seats and connected in a use position due to the extension thereof, or head, which rests on the body of the support.

This known pin remains in the work position due to the inclusion, at its opposite end with respect to the head, of a Seeger ring, or elastic ring, which prevents the pin from exiting the seats.

Figure 2:
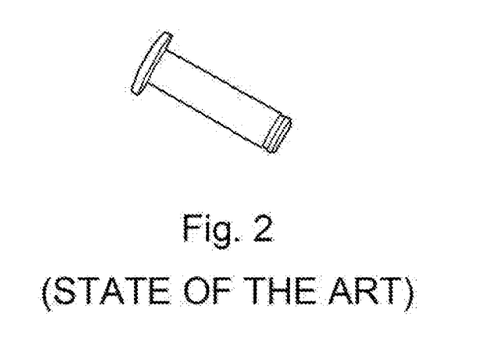
FIG. 2 shows an axonometric view of a detail of the pin of the solution in FIG. 1 of the prior art.

This known pin, as can be seen from FIG. 2, is made by means of molding and the seat made therein for the elastic element, or Seeger ring, is obtained by means of mechanical processing.

Therefore, besides being particularly laborious to be achieved, this known solution also requires an automatic assembly system, which allows the Seeger to be inserted into its seat, thus preventing the accidental exit of the pin.

Furthermore, this known solution leaves many parts of the molded pin in sight, which molded pin is often galvanized due to wear and aesthetics problems, for example. Should the galvanizing have flaws during the assembly step, it would be necessary to discard the pin simply for aesthetic reasons, forcing a pin sorting station to be introduced into the assembly line.

Figure 3:
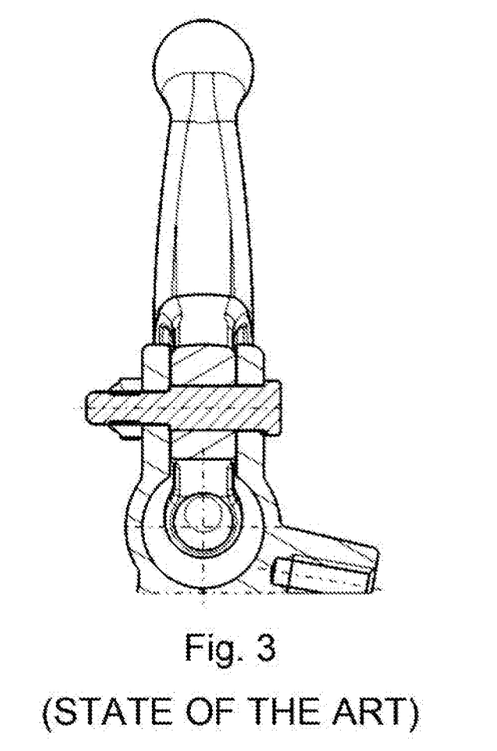
FIG. 3 depicts a local section of a second solution according to the prior art.

FIG. 3 depicts a local section of a further solution according to the prior art.

In this known solution, the pin always has an enlarged head and a stem with a threaded end portion protruding from the seats of the lever and the support thereof for engaging a locking nut.

Figure 4:
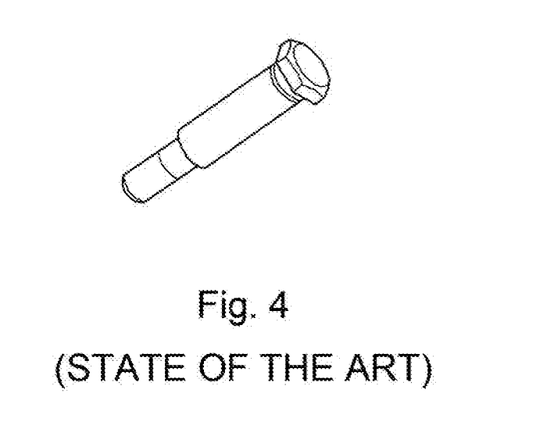
FIG. 4 depicts an axonometric view of a pin of the solution in FIG. 3 of the prior art.
Figure 5:
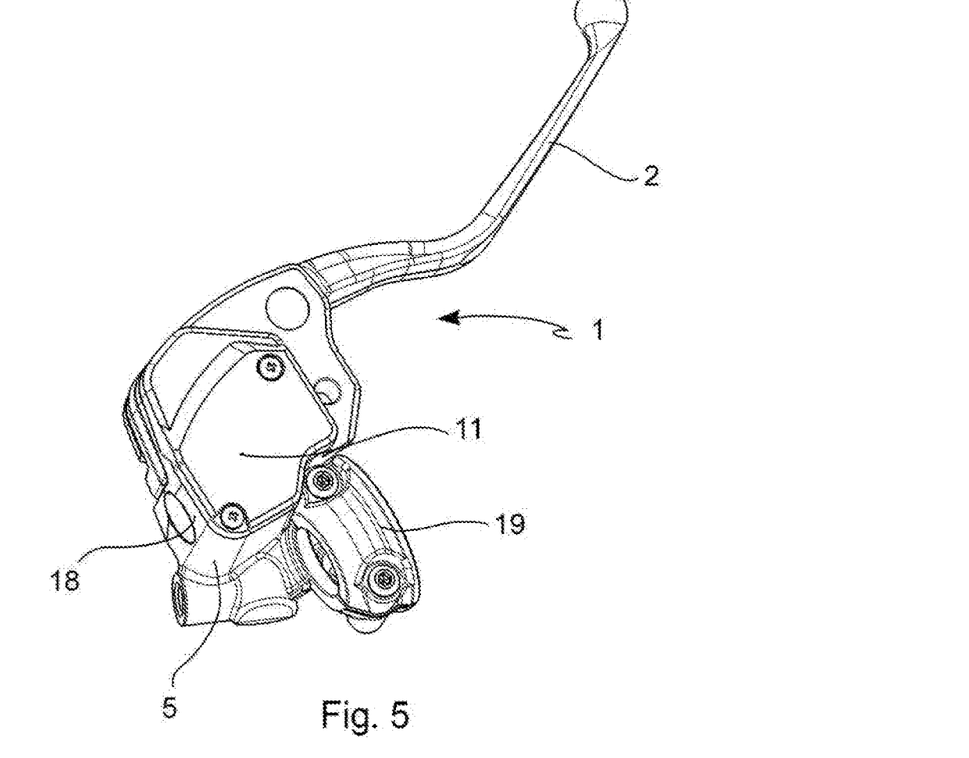
FIG. 5 depicts an axonometric view of a lever assembly according to the invention, along with a pump and a tank.
Figure 6:
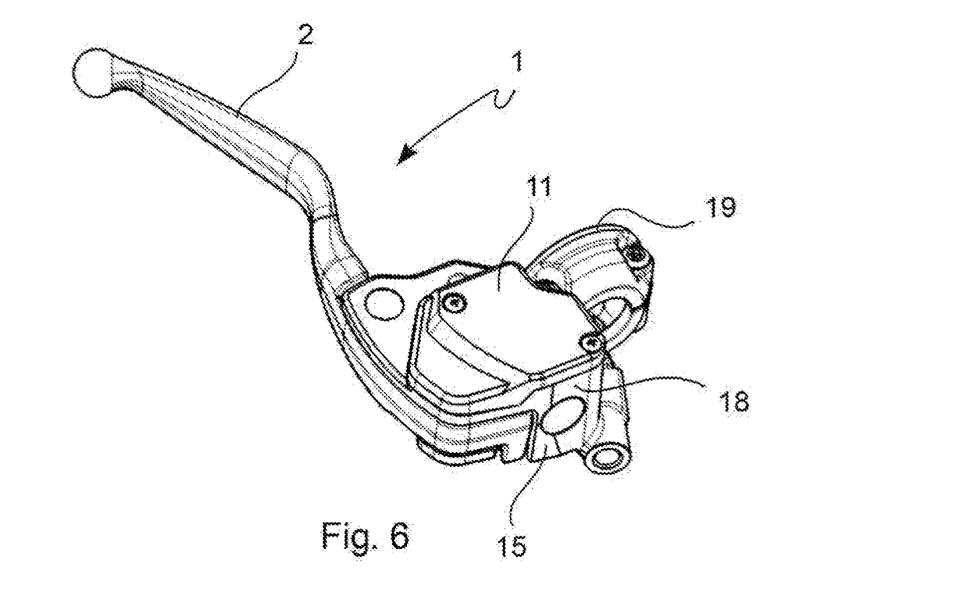
FIG. 6 depicts an axonometric view of the assembly and pump body and tank in FIG. 5 according to a further point of view.
Figure 7:
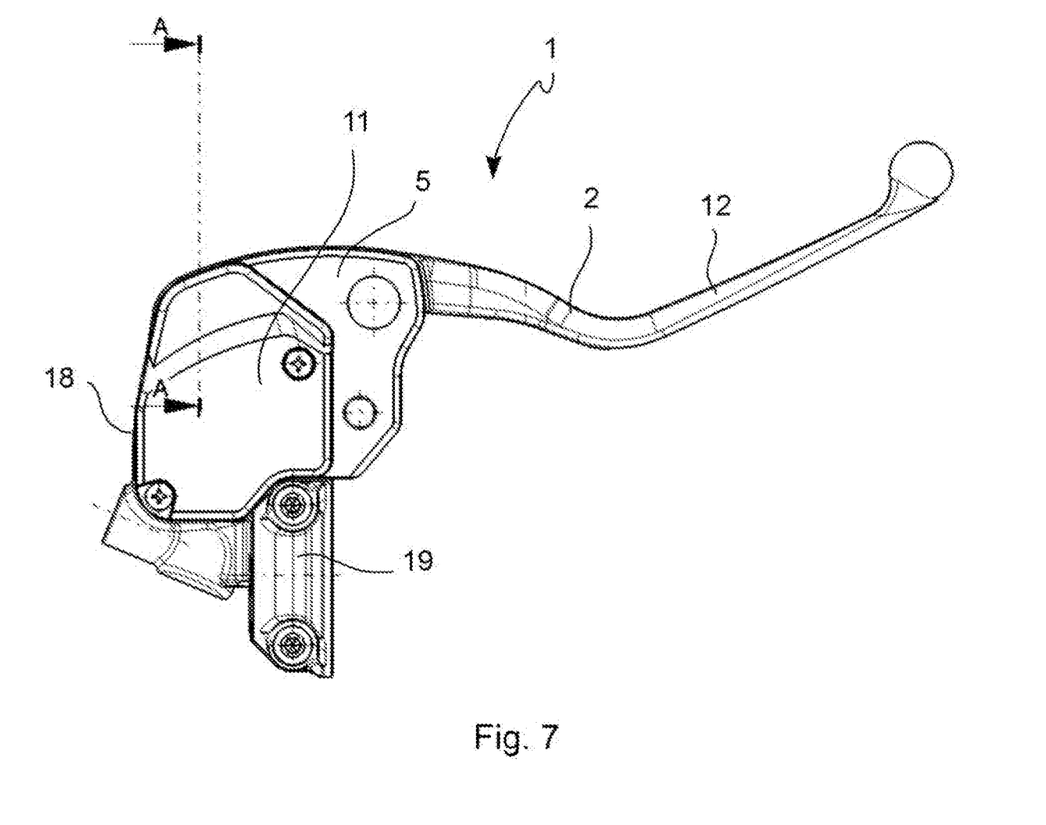
FIG. 7 depicts a top view of the solution in FIG. 5.
Figure 8:
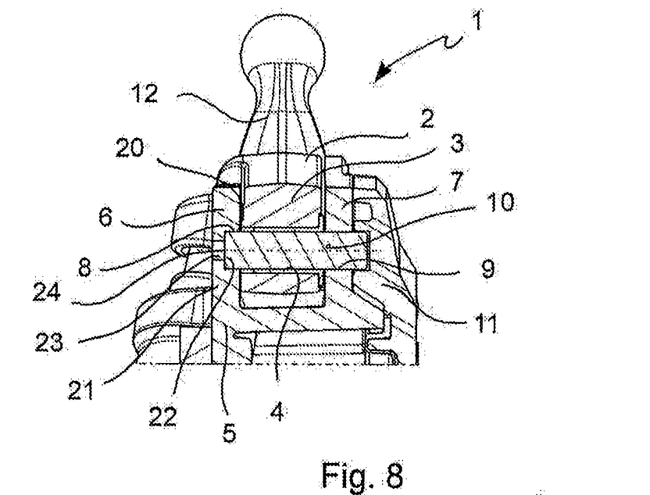
FIG. 8 depicts a local section according to line A-A in FIG. 7.
Figure 9:
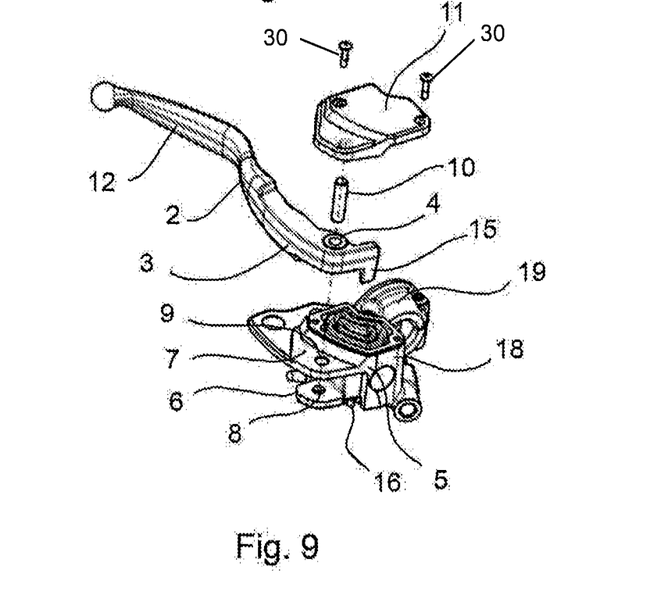
FIG. 9 depicts the solution in FIG. 5 in axonometry and with separated parts.
Figure 10:
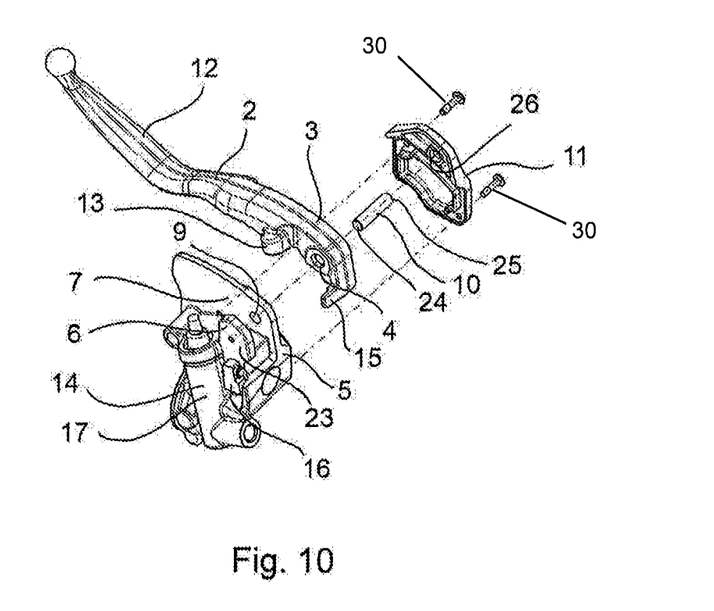
FIG. 10 depicts an axonometric view of the assembly in FIG. 5 according to a further point of view.
Figure 11:
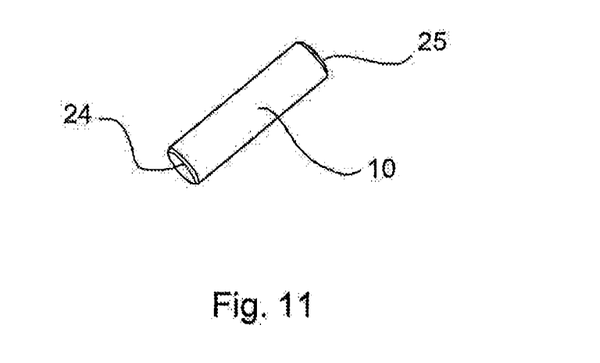
FIG. 11 depicts an axonometric view of a pin of the lever assembly according to the invention.

FIG. 4 shows an axonometric view of this known pin.

In this known solution, in which the pin is molded, the thread is obtained by mechanical processing and involves the use of special equipment for tightening the locking nut of the pin with predetermined tightening torques to prevent the accidental unscrewing of the nut and the exit of the pin.

Therefore, the need is strongly felt to simplify the construction of the known lever assembly solutions reducing the number of details, better protecting the device, and in particular the articulation pin, as well as reducing the assembly complexity and aesthetic problems.

Solution

It is therefore an object of the present invention to overcome the drawbacks of the prior art and offer a solution to the need to provide a lever assembly, which is easy to be constructed and especially reliable.

This and other objects are achieved by a lever assembly according to claim 1, and by the assembly and disassembly method in claim 10. Various advantageous embodiments form the subject of the dependent claims.

DRAWINGS

Further features and advantages of the lever assembly according to the invention will become apparent from the description of preferred embodiments thereof, given below by way of not limiting example, with reference to the accompanying drawings, in which.

DESCRIPTION OF SOME PREFERRED EMBODIMENTS

With reference to the drawings, a lever assembly is shown by numeral reference 1.

According to a general embodiment, a lever assembly 1 comprises a control lever 2 having at least one lever coupling portion 3 delimiting a lever rotation seat 4.

Said assembly also comprises a lever support 5 comprising at least one support tooth 6; 7. Said at least one support tooth 6; 7 delimits a tooth seat 8; 9.

Said assembly also comprises an articulation pin 10 received in said tooth seat 8; 9 of at least one support tooth 6; 7 and also received in said lever rotation seat 4 for the rotation of the control lever 2 with respect to said lever support 5.

Said lever assembly 1 advantageously comprises at least one cover 11 connected to said lever support 5, which at least partially closes at least one of said tooth seat 8 and said rotation seat 4, to prevent the pin 10 from exiting said seats 4, 8 and rotatably constrain the lever 2 to the support 5.

According to one embodiment, in addition to the at least one coupling portion 3, said control lever 2 comprises a grasping portion 12 adapted to be grasped by at least one finger of a driver.

According to one embodiment, said control lever 2 comprises a pump control extension 13 adapted to act in conjunction with a pump 14 for actuating a brake or clutch.

According to one embodiment, said control lever 2 comprises a microswitch control extension 15 adapted to act in conjunction with a microswitch 16 to signal the actuation of the control lever 2.

According to one embodiment, said lever support 5 comprises two teeth, a support tooth 6 and a through tooth 7. Said two teeth 6, 7 form said tooth seat 8 and a through tooth seat 9, respectively.

According to one embodiment, said lever coupling portion is received between said two teeth 6, 7 so as to align said rotation seat 4 with said tooth seat 8 and through tooth seat 9 for receiving said articulation pin 10 in said seats 8, 4, 9.

According to one embodiment, said lever support 5 comprises a pump body 17.

According to one embodiment, said lever support 5 is made in one body, or one piece, with said pump body 17.

According to one embodiment, said lever support 5 comprises a tank 18 for supplying fluid to a pump body 17.

According to one embodiment, said lever support 5 is made in one body, or one piece, with said tank 18.

According to one embodiment, said lever support 5 comprises a support-handle connecting portion 19 adapted to connect said support 5 to a handle of a vehicle.

According to one embodiment, said at least one support tooth 6; 7, which delimits a tooth seat 8; 9, comprises an insertion seat end 20 and an opposite abutment seat end 21.

According to one embodiment, said opposite abutment seat end 21 comprises a tooth support surface 22, which allows the articulation pin 10 to be supported so as to prevent it from exiting the side opposite to the insertion seat end 20, or the side opposite to said cover 11 placed on the insertion side.

According to one embodiment, said opposite abutment seat end 21 comprises a maneuvering opening 23, which prevents the pin 10 from exiting, but allows a tool to extract the pin from the seats 4, 8; 9 when the cover 11 is removed.

According to one embodiment, said articulation pin 10 comprises a first end support surface 24, which rests on a tooth support surface 22, which allows the articulation pin 10 to be supported so as to prevent it from exiting the side opposite to said cover 11 and the insertion side.

According to one embodiment, said articulation pin 10 comprises a second end support surface 25, which rests on a cover support surface 26, which allows to block the articulation pin 10 in the seats 4, 8; 9, so as to prevent it from exiting when said cover 11 is connected in place to the support 5.

According to one embodiment, said articulation pin 10 comprises a body having a main longitudinal extension and a constant transverse size.

According to one embodiment, said articulation pin 10 comprises a cylindrical-shaped body.

According to one embodiment, said articulation pin 10 is obtained from a bar.

According to one embodiment, said cover 11 is in one piece with a tank cover 27 adapted to close a tank 18.

According to one embodiment, said cover 11 is connected to the lever support 5 by threaded devices 30.

According to one embodiment, said cover 11 is connected to the tank 27 by threaded devices 30.

According to one embodiment, said cover 11 comprises a cover support surface 26, which acts in conjunction with a second end support surface 25 of the pin 10, thus blocking said pin 10 received in said rotation seat 4 of the lever 2 and in said tooth seat 8 of said support tooth 6, thus rotatably constraining said lever 2 to said support 5.

According to one embodiment, said cover 11 completely closes said at least one of said tooth seat 8 and said rotation seat 4.

A method of assembling or disassembling a lever assembly 1 will be described below.

This method incudes the steps of:
providing a lever assembly 1 as described in any one of the above-listed embodiments;
aligning said rotation seat 4 of said control lever 2 with said tooth seat 8 of the support tooth 6;
inserting said articulation pin 10;
connecting said cover 11 to said lever support 5 at least partially closing at least one of said tooth seat 8 and rotation seat 4, and preventing the pin 10 from exiting said seats 4, 8, rotatably constraining the lever 2 to the support 5.

A method of disassembling a lever assembly 1 is described below.

This method includes the steps of:
providing a maneuvering opening 23 as defined in any one of the above-listed embodiments;
removing said cover 11;
inserting a tool into said maneuvering opening 23 removing the articulation pin 11 from said tooth seat 8 and rotation seat 4;
removing the lever coupling portion 3 from said support tooth 6 by removing said control lever 2 from said lever support 5.

Due to the described embodiments, it is possible to simplify the construction of the lever assembly, for example it is possible to eliminate the component which avoids the removal of the pin (the Seeger in FIG. 1 or the nut in FIG. 3) making the cover perform this function, e.g. the tank cover.

For example, it is possible to make a pin obtained from a bar. This rests on the tooth seat of the support and is contained by the cover.

According to a particular disassembly method, in order to facilitate the removal of the pin, a through hole is present in the support body of the tooth, so that the pin is pushed by a tool to be removed from the seat.

Some of the advantages of these assembly solutions as described above are:
elimination of constructional details;
greater protection of the lever pin;
lever pin obtained from a simple bar without additional processing other than cutting;
elimination of the aesthetic defects as the pin is hidden below the cover.

REFERENCE LIST

1 lever assembly
2 control lever
3 lever coupling portion
4 rotation seat
5 lever support
6 support tooth
7 through tooth
8 tooth seat
9 through seat of through tooth
10 articulation pin
11 cover
12 lever grasping portion
13 pump control extension
14 pump
15 microswitch control extension
16 microswitch
17 pump body
18 tank
19 support-handle connecting portion
20 insertion seat end 21 opposite abutment seat end
22 tooth support surface
23 maneuvering opening
24 first end support surface
25 second end support surface
26 cover support surface

The invention claimed is:

1. A lever assembly comprising:
a control lever having at least one lever coupling portion which delimits a lever rotation seat;
a lever support comprising at least one support tooth, said at least one support tooth delimits a tooth seat;
an articulation pin received in said tooth seat of said at least one support tooth and received in said lever rotation seat, for the rotation of the control lever with respect to said lever support;
wherein
said lever assembly comprises at least one cover connected to said lever support, thus at least partly closing at least one from among said tooth seat and rotation seat to prevent the exit of the articulation pin from said seats, thus rotatably constraining the control lever to the lever support,
wherein said at least one support tooth which delimits a tooth seat comprises an insertion seat end and an opposite abutment seat end; and wherein
said opposite abutment seat end comprises a tooth support surface which supports the articulation pin so as to prevent an exit thereof from a side opposite to the insertion seat end or a side opposite to said cover and an insertion side; and wherein
said opposite abutment seat end comprises a maneuvering opening which prevents the articulation pin from exiting but allows a tool to extract the articulation pin from the seats when the cover has been removed.

2. The lever assembly according to claim 1, wherein:
in addition to comprising at least one coupling portion, said control lever comprises a grasping portion suitable for being grasped by at least one finger of a driver; and/or wherein
said control lever comprises a pump control extension suitable for acting in conjunction with a pump to actuate a brake or a clutch; and/or wherein
said control lever comprises a microswitch control extension suitable for acting in conjunction with a microswitch to signal the actuation of the control lever.

3. The lever assembly according to claim 1, wherein:
said lever support comprises a support tooth and a through tooth, said support tooth forming said tooth seat and said through tooth forming a tooth through seat;
said lever coupling portion is received between said two teeth so as to align said rotation seat to said tooth seat and tooth through seat to receive said articulation pin in said seats.

4. The lever assembly according to claim 1, wherein:
said lever support comprises a pump body; and/or wherein said lever support is in a single body, or single piece, with said pump body; and/or wherein
said lever support comprises a tank for supplying a pump body with fluid; and/or wherein said lever support is in a single body, or single piece, with said tank; and/or wherein
said lever support comprises a support-handle connecting portion suitable for connecting said lever support to a handle of a vehicle.

5. The lever assembly according to claim 1, wherein:
said articulation pin comprises a first end support surface which is resting on a tooth support surface which supports the articulation pin so as to prevent an exit thereof from the side opposite to said cover and the insertion side; and/or wherein
said articulation pin comprises a second end support surface which is resting on a cover support surface which blocks the articulation pin in the seats so as to prevent an exit when said cover is in place connected to the lever support.

6. The lever assembly according to claim 1, wherein:
said articulation pin comprises a body having a main longitudinal extension and a constant transverse size; and/or wherein
said articulation pin comprises a cylindrical-shaped body; and/or wherein
said articulation pin is obtained from a bar.

7. The lever assembly according to claim 1, wherein:
said cover is in a single piece with a tank cover suitable for closing a tank;
said cover is connected to the lever support via at least a threaded device.

8. The lever assembly according to claim 1, wherein:
said cover comprises a cover support surface which acts in conjunction with a second end support surface of the articulation pin which is axially opposite to a first end support surface, thus blocking the articulation pin received in said rotation seat of the lever and said tooth seat of said support tooth, thus rotatably constraining said lever to said lever support; and/or wherein
said cover completely closes said at least one from among said tooth seat and said rotation seat.

9. A method for assembling or disassembling a lever assembly, wherein there are provided the steps of:
providing said lever assembly comprising:
a control lever having at least one lever coupling portion which delimits a lever rotation seat;
a lever support comprising at least one support tooth, said at least one support tooth delimits a tooth seat;
an articulation pin received in said tooth seat of said at least one support tooth and received in said lever rotation seat, for the rotation of the control lever with respect to said lever support;
wherein
said lever assembly comprises at least one cover connected to said lever support, thus at least partly closing at least one from among said tooth seat and rotation seat to prevent the exit of the articulation pin from said seats, thus rotatably constraining the control lever to the lever support,
wherein said at least one support tooth which delimits a tooth seat comprises an insertion seat end and an opposite abutment seat end; and
wherein said opposite abutment seat end comprises a tooth support surface which supports the articulation pin so as to prevent an exit thereof from a side opposite to the insertion seat end or a side opposite to said cover and an insertion side; and wherein
said opposite abutment seat end comprises a maneuvering opening which prevents the articulation pin from exiting but allows a tool to extract the articulation pin from the seats when the cover has been removed;
aligning said rotation seat of said control lever to said tooth seat of the support tooth;
inserting said articulation pin;

connecting said cover to said lever support, thus at least partly closing at least one from among the tooth seat and the rotation seat, and thus preventing the exit of the articulation pin from said seats, rotatably constraining the control lever to the lever support.

10. A method of disassembling a lever assembly, wherein there are provided the steps of:
providing said lever assembly comprising:
  a control lever having at least one lever coupling portion which delimits a lever rotation seat;
  a lever support comprising at least one support tooth, said at least one support tooth delimits a tooth seat;
  an articulation pin received in said tooth seat of said at least one support tooth and received in said lever rotation seat, for the rotation of the control lever with respect to said lever support;
  wherein
    said lever assembly comprises at least one cover connected to said lever support, thus at least partly closing at least one from among said tooth seat and rotation seat to prevent the exit of the articulation pin from said seats, thus rotatably constraining the control lever to the lever support,
    wherein said at least one support tooth which delimits a tooth seat comprises an insertion seat end and an opposite abutment seat end; and wherein
    said opposite abutment seat end comprises a tooth support surface which supports the articulation pin so as to prevent an exit thereof from a side opposite to the insertion seat end or a side opposite to said cover and an insertion side; and wherein
    said opposite abutment seat end comprises a maneuvering opening which prevents the articulation pin from exiting but allows a tool to extract the articulation pin from the seats when the cover has been removed;
removing said at least one cover;
inserting said tool into the maneuvering opening by removing said articulation pin from said tooth seat and said rotation seat;
removing a lever coupling portion from said support tooth by removing said control lever from said lever support.

* * * * *